A. Q. ROSS.
TOY HORSE AND CARRIAGE.
No. 186,880. Patented Jan. 30, 1877.
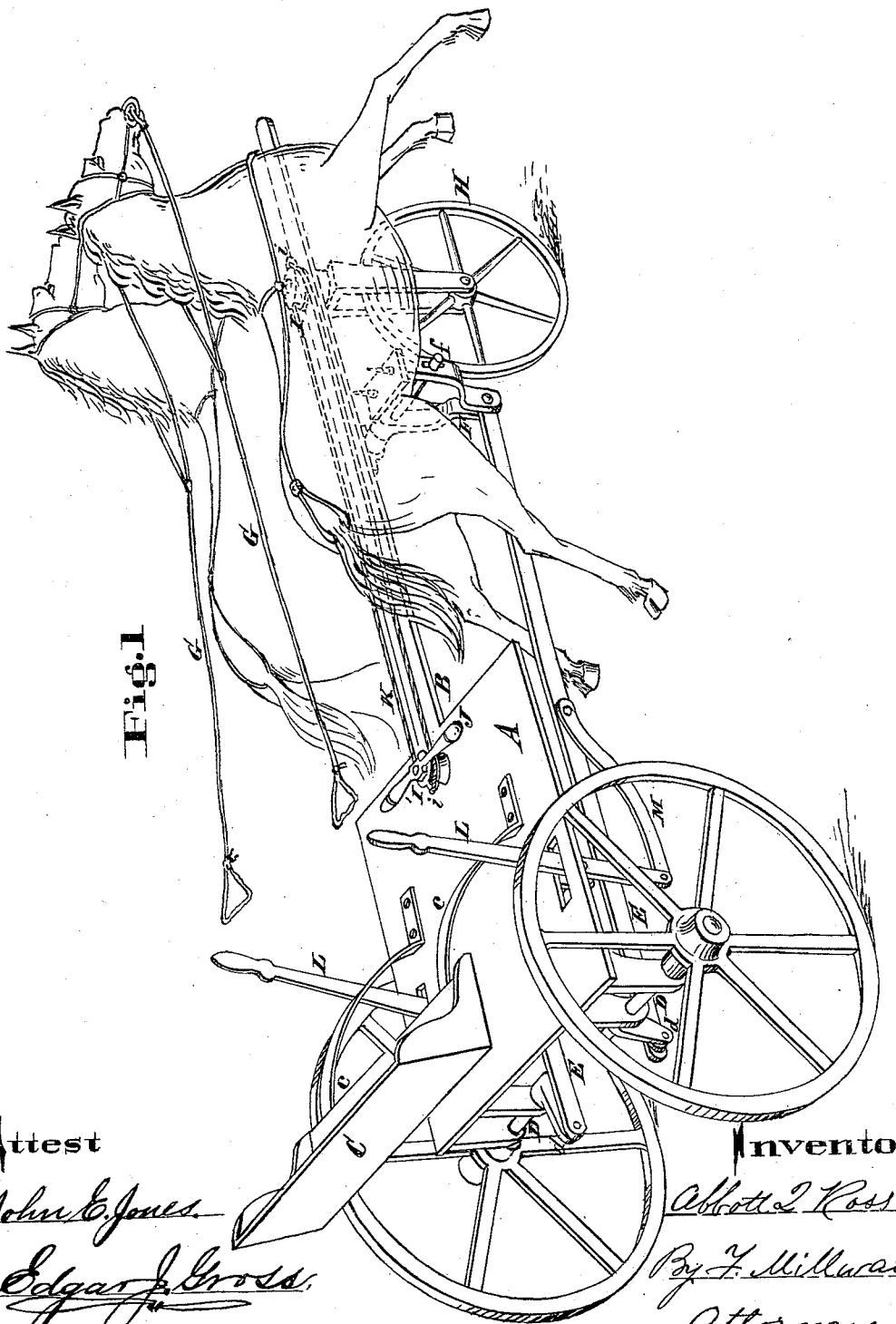

UNITED STATES PATENT OFFICE.

ABBOTT Q. ROSS, OF CINCINNATI, OHIO.

IMPROVEMENT IN TOY HORSE AND CARRIAGE.

Specification forming part of Letters Patent No. 186,880, dated January 30, 1877; application filed January 11, 1877.

*To all whom it may concern:*

Be it known that I, ABBOTT Q. ROSS, of Cincinnati, Hamilton county, State of Ohio, have invented an Improvement in Toy Galloping Horses and Carriage, of which the following is a specification:

My invention relates to the construction of a toy carriage and horses, in which the wheels of the carriage are propelled by the movement of the hands of the child who occupies the carriage, and is designed to approach nearer a representation of real life, by concealing, as it were, the means of propulsion, and give the "turn-out" the appearance of being operated by the unaided action of the horses.

My invention consists, in the first part, in such a construction and combination of the vehicle and the horse or horses that the occupant of the vehicle may be enabled to forcibly rotate the wheels of the vehicle by the simple act of pulling on the reins and slackening them alternately.

My invention further consists, in connection with the device by which the wheels are connected to the horse or horses, of a lever at one or both sides of the vehicle, by which, when but one horse is used to communicate motion to the wheels, a lever may be used to produce the return motion of the propelling-crank of said wheels.

The accompanying drawing, Figure 1, is a perspective view of my improved toy.

A is the body of the vehicle; B, the tongue of the same; and C, a seat, supported on flat springs *c c*, for the occupancy of the child who is to occupy and propel the vehicle. When the vehicle is to be propelled by one horse only the axle may be in one piece with a "return-crank" to connect with the horse; but I prefer to use two horses, and connect them as follows: The axle D is in two parts, each having a crank, *d*, to which I attach a pitman, E, whose forward end is loosely coupled to a double-sided lever, F, which pivots on a fixed bar, *f*, and has its upper end secured firmly to the body of the horse, as shown in dotted lines. The fixed bars or studs *f* are firmly secured to the tongue, and project from each side of the same.

The mouth of each horse is fitted with metal rings on each side to imitate the usual bit, and the reins G are secured to these rings, as shown. When the horses are fragile structures, a metal strap may run from the bit-rings, and connect firmly with the body. By reason of the fact that the horses are attached so as to oscillate on the fixed pivots *f*, and carry levers F, which connect, in the manner shown, with the cranks of the divided axle, the rider in the vehicle is enabled, by the simple alternate pulling of the two lines G, to give the requisite motion to the vehicle. This alternate movement, however, is only necessary when two horses are used, and they are adjusted to gallop alternately. When one horse is used, or when the horses are adjusted to gallop together, both lines are pulled at the same time, and consequently slackened at the same time, to allow the return of the crank or cranks without any opposing strain on the reins.

To support the horses off the ground, and for steering purposes, I provide the swiveling wheel H, which is journaled in a fork whose upper end projects through the tongue and carries a sheave-wheel, I. I provide a swiveling bar, J, at the front end of the vehicle, also fitted with a sheave-wheel, I'. A cord or wire-rope, K, passes around these sheave-wheels; and in order to prevent slipping, and consequent displacement of the proper relation between the front wheel and bar J, I form loops *i* on the sheave-wheels, to which the driving cord or rope K is secured. The feet of the rider rest upon the opposing arms of the bar J, and, through this positively-attached cord, conveniently operate the steering-wheel H. Owing to the fact that the axle D is divided, preferably, when two horses are used, the cranks change their relation in describing curves, and for running in straight lines they may be adjusted originally by the rider before starting off, either to gallop together or alternately.

As an additional feature of my improvement, which may, of course, be dispensed with, I attach either one or two levers, L, by pivot-pins, to the body of the vehicle, the lever or levers having a link-connection, M, with the pitman or pitmen E. By means of one of these the return of the crank, after it has pulled in one direction by the tension on the lines, may be facilitated. To dispense, however, with the necessity for these levers, I place the pivots $f$ of the horse or horses so far to the rear of the center of gravity of the animal that the forward weight will of itself create or facilitate this return movement, and this I sometimes further facilitate by the employment of a coiled spring, acting to keep the horses down in front.

I have said that when one horse alone is used the axle may be continuous or in one piece, having one crank—a return or U-shaped crank, as it is termed; but in some cases, even when one horse is used, the crank-axle may be divided, with a crank to each division, one crank to the horse and the other to a hand-lever, L; or there may be two cranks to one division, and one to the other, one on each division being connected to a hand-lever, L, and the other to the horse.

I claim—

1. The combination, substantially as specified, of a toy galloping horse, mounted upon a carriage, and intermediate means between the horse and the propelling devices of the carriage, whereby the galloping of the horse will cause the propulsion of the carriage, or vice versa.

2. The combination, substantially as specified, of the galloping horse, the wheels of the carriage, mechanism for transmitting the motion from one to the other, and propelling means under the control of the rider.

3. The combination, substantially as specified, of the galloping horse, the reins for actuating it, the wheels of the carriage, and intermediate mechanism for transmitting motion from the horse to the wheels.

In testimony of which invention I hereunto set my hand.

ABBOTT Q. ROSS.

Witnesses:
JOHN E. JONES,
J. L. WARTMANN.